US012755673B2

(12) United States Patent
Kim et al.

(10) Patent No.: US 12,755,673 B2
(45) Date of Patent: Oct. 6, 2026

(54) DISPLAY DEVICE

(71) Applicant: LG Display Co., Ltd., Seoul (KR)

(72) Inventors: JeongOh Kim, Paju-si (KR); MyungJae Yoo, Paju-si (KR); Geumyoung Lee, Paju-si (KR); Seong Ho Kang, Paju-si (KR); Jaechoul Yu, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/472,314

(22) Filed: Sep. 22, 2023

(65) Prior Publication Data

US 2024/0185770 A1 Jun. 6, 2024

(30) Foreign Application Priority Data

Dec. 1, 2022 (KR) ........................ 10-2022-0165659

(51) Int. Cl.

*G09G 3/32* (2016.01)
*H10K 59/122* (2023.01)
*H10K 59/131* (2023.01)
*H10K 59/80* (2023.01)

(52) U.S. Cl.

CPC ........... *G09G 3/32* (2013.01); *G09G 2330/06* (2013.01)

(58) Field of Classification Search

None
See application file for complete search history.

(56) References Cited

U.S. PATENT DOCUMENTS

| | | | | |
|---|---|---|---|---|
| 11,861,110 B1 * | 1/2024 | Kitsomboonloha | .. | G06F 3/0443 |
| 2006/0113920 A1 * | 6/2006 | Choi | | H01J 11/36 315/169.3 |
| 2007/0131989 A1 * | 6/2007 | Liu | | H01L 27/124 257/E27.111 |
| 2012/0320491 A1 * | 12/2012 | Doh | | H01L 21/6833 361/234 |
| 2015/0301415 A1 * | 10/2015 | Sawada | | G02F 1/134336 349/147 |
| 2016/0066409 A1 * | 3/2016 | Kwon | | H01L 27/124 174/254 |
| 2018/0108649 A1 * | 4/2018 | Cheng | | H01L 27/0296 |
| 2018/0188568 A1 * | 7/2018 | Kim | | H01L 29/7869 |
| 2019/0165312 A1 * | 5/2019 | Bae | | G09G 3/20 |
| 2020/0135835 A1 * | 4/2020 | Seo | | H10K 59/131 |
| 2020/0194534 A1 * | 6/2020 | Park | | H10K 59/131 |
| 2020/0203641 A1 * | 6/2020 | Lee | | G02F 1/136286 |
| 2020/0212115 A1 * | 7/2020 | Choi | | H10K 50/86 |

(Continued)

FOREIGN PATENT DOCUMENTS

| | | |
|---|---|---|
| KR | 20160070257 A | 6/2016 |
| KR | 20200003337 A | 1/2020 |

(Continued)

OTHER PUBLICATIONS

Office Action in Korean Appln. No. 10-2022-0165659, mailed on Jan. 27, 2026, 14 pages (with English translation).

*Primary Examiner* — Sepehr Azari
(74) *Attorney, Agent, or Firm* — Fish & Richardson P.C.

(57) ABSTRACT

A display device capable of preventing arching due to deflection of plasma and static electricity by including an outer discharge line, an inner discharge line, a discharge link, and a static electricity discharge circuit electrically connected with the inner discharge line.

20 Claims, 14 Drawing Sheets

(56) References Cited

U.S. PATENT DOCUMENTS

| | | | | |
|---|---|---|---|---|
| 2020/0321292 | A1* | 10/2020 | Park | H10K 59/131 |
| 2020/0335722 | A1* | 10/2020 | Kim | H10K 59/8731 |
| 2021/0165517 | A1* | 6/2021 | Lee | H10K 59/873 |
| 2021/0183985 | A1* | 6/2021 | Lim | G09G 3/3208 |
| 2021/0217835 | A1* | 7/2021 | Park | H10K 59/8723 |
| 2022/0075483 | A1* | 3/2022 | Yan | G06F 3/0418 |
| 2022/0114930 | A1* | 4/2022 | Jiang | G09G 3/006 |
| 2022/0131103 | A1* | 4/2022 | Sung | H10K 71/00 |
| 2022/0137738 | A1* | 5/2022 | Kim | H10K 59/805<br>345/174 |
| 2022/0180784 | A1* | 6/2022 | Liu | G09G 3/20 |

FOREIGN PATENT DOCUMENTS

| | | | |
|---|---|---|---|
| KR | 20200118316 | A | 10/2020 |
| KR | 20210055422 | A | 5/2021 |

* cited by examiner

DISPLAY DEVICE

CROSS-REFERENCE TO RELATED APPLICATION

This application claims the priority of Korean Patent Application No. 10-2022-0165659, filed on Dec. 1, 2022, which is hereby incorporated by reference in its entirety.

BACKGROUND

Field of the Present Disclosure

The present disclosure relates to display devices.

Description of the Background

As information and communication technology develops, demand for display devices for displaying information is increasing. The display device may include a plurality of pixels to display information and display information by applying a signal to each pixel.

To enhance the display quality of the display device, more pixels are included and integrated in the display device. However, it may be difficult to manufacture high-integrated display devices.

To manufacture a high-integrated display device, deposition or sputtering may be performed on a prepared high-integrated transistor board using a mask. However, contact of the mask to the board may cause a defect due to static electricity due to a foreign body or arching due to deflection of plasma.

A process for preventing static electricity by anodizing the surface of the mask may be adopted to address the foregoing issues, but this method may still leave the defects.

The above information disclosed in this Background section is only for enhancement of understanding of the background of the described technology and therefore it may contain information that does not form prior art that is already known to a person of ordinary skill in the art.

SUMMARY

Accordingly, the present disclosure is to provide a display device capable of preventing defects by discharging the overcurrent generated during deposition and mask contact by including an outer discharge line, an inner discharge line, a discharge link, and a static electricity discharge circuit.

More specifically, the present disclosure is to provide a display device capable of preventing arching due to deflection of plasma and static electricity by including an outer discharge line, inner discharge line, a discharge link, and a static electricity discharge circuit electrically connected with the inner discharge line.

The present disclosure is also to provide a display device including a substrate, a dam, an outer discharge line, an inner discharge line, a discharge link, and a static electricity discharge circuit.

The dam may be positioned on the marginal portion of the substrate.

The outer discharge line may be positioned outside the dam.

The inner discharge line may be positioned inside the dam.

The discharge link may pass from the outer discharge line side through the dam and contact the inner discharge line.

The static electricity discharge circuit may be electrically connected with the inner discharge line.

According to the present disclosure, there may be provided a display device capable of preventing arching by including an outer discharge line, inner discharge line, a discharge link, and a static electricity discharge circuit electrically connected with the inner discharge line.

The substrate may include an active area where a plurality of subpixels are disposed, and a non-active area positioned outside the active area and surrounding the active area.

The outer discharge line may be positioned in the non-active area of the substrate.

The inner discharge line may be positioned in the non-active area of the substrate and inside the outer discharge line.

The discharge link may be positioned adjacent to the outer discharge line and extend perpendicular to the outer discharge line, and may contact the inner discharge line.

The static electricity discharge circuit may be electrically connected with the inner discharge line.

It is to be understood that both the foregoing general description and the following detailed description are exemplary and explanatory and are intended to provide further explanation of the present disclosure as claimed.

BRIEF DESCRIPTION OF THE DRAWINGS

The above and other features, and advantages of the present disclosure will be more clearly understood from the following detailed description, taken in conjunction with the accompanying drawings, in which.

DETAILED DESCRIPTION

Figure 1:
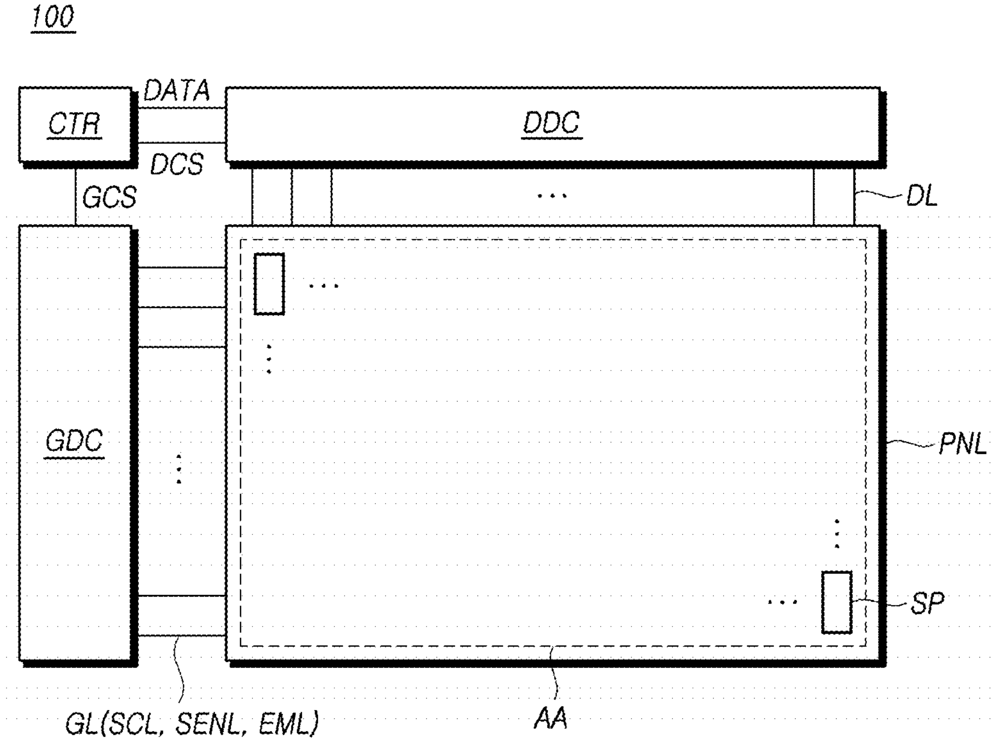
FIG. 1 is a view illustrating a system configuration of a display device according to aspects of the present disclosure.

In the following description of examples or aspects of the present disclosure, reference will be made to the accompanying drawings in which it is shown by way of illustration specific examples or aspects that may be implemented, and in which the same reference numerals and signs may be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps with" etc. a second element, it should be interpreted that, not only may the first element "be directly connected or coupled to" or "directly contact or overlap with" the second element, but a third element may also be "interposed" between the first and second elements, or the first and second elements may "be connected or coupled to", "contact or overlap with", etc. each other via a fourth element. Here, the second element may be included in at least one of two or more elements that "are connected or coupled to", "contact or overlap with", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e. g., level, range, etc.) include a tolerance or error range that may be caused by various factors (e. g., process factors, internal or external impact, noise, etc.) even when a relevant description is not specified. Further, the term "may" fully encompasses all the meanings of the term "may".

Hereinafter, various aspects of the present disclosure are described in detail with reference to the accompanying drawings.

FIG. 1 is a view illustrating a system configuration of a display device 100 according to aspects of the present disclosure.

Referring to FIG. 1, a display device 100 according to the present aspects may include a display panel PNL where a plurality of data lines DL and a plurality of gate lines GL are arranged, and a plurality of subpixels SP connected with the plurality of data lines DL and the plurality of gate lines GL are arranged in an active area A and a driving circuit for driving the display panel PNL.

From a functional point of view, the driving circuit may include a data driving circuit DDC driving the plurality of data lines DL, a gate driving circuit GDC driving the plurality of gate lines GL, and a controller CTR controlling the data driving circuit DDC and the gate driving circuit GDC.

In the display panel PNL, the plurality of data lines DL and the plurality of gate lines GL may be disposed to cross each other. For example, the plurality of data lines DL may be arranged in rows or columns, and the plurality of gate lines GL may be arranged in columns or rows. For ease of description, it is assumed below that the plurality of data lines DL are arranged in rows, and the plurality of gate lines GL are arranged in columns.

The controller CTR supplies various control signals DCS and GCS necessary for the driving operations of the data driving circuit DDC and the gate driving circuit GDC to control the data driving circuit DDC and the gate driving circuit GDC.

The controller CTR starts scanning according to a timing implemented in each frame, converts input image data input from the outside into image data DATA suited for the data signal format used in the data driving circuit DDC, outputs the image data DATA, and controls data driving at an appropriate time suited for scanning.

The controller CTR may be a timing controller used in typical display technology, or a control device that may perform other control functions as well as the functions of the timing controller.

The controller CTR may be implemented as a separate component from the data driving circuit DDC, or the controller CTR, along with the data driving circuit DDC, may be implemented as an integrated circuit.

The data driving circuit DDC receives the image data DATA from the controller CTR and supply data voltage to the plurality of data lines DL, thereby driving the plurality of data lines DL. Here, data driving circuit DDC is also referred to as a 'source driving circuit.'

The data driving circuit DDC may include at least one source driver integrated circuit S-DIC. Each source driver integrated circuit S-DIC may include a shift register, a latch circuit, a digital-to-analog converter DAC, and an output buffer. In some cases, each source driver integrated circuit S-DIC may further include an analog-digital converter ADC.

Each source driver integrated circuit S-DIC may be connected to the bonding pad of the display panel PNL in a tape automated bonding (TAB) or chip-on-glass (COG) scheme or may be directly disposed on the display panel PNL or, in some cases, may be integrated in the display panel PNL. Each source driver integrated circuit S-DIC may also be implemented in a chip-on-film (COF) scheme to be mounted on a source-circuit film connected to the display panel PNL.

The gate driving circuit GDC sequentially drives the plurality of gate lines GL by sequentially supplying scan signals to the plurality of gate lines GL. Here, gate driving circuit GDC is also referred to as a 'scan driving circuit.'

The gate driving circuit GDC may be connected to the bonding pad of the display panel PNL in a tape automated bonding (TAB) or chip-on-glass (COG) scheme or may be implemented in a gate-in-panel (GIP) type to be directly disposed on the display panel PNL or, in some cases, may be integrated in the display panel PNL. Further, the gate driving circuit GDC may be implemented in a chip-on-film (COF) scheme implemented with a plurality of gate driver integrated circuits G-DIC and mounted on a gate-circuit film connected to the display panel PNL.

The gate driving circuit GDC sequentially supplies scan signals of On voltage or Off voltage to the plurality of gate lines GL under the control of the controller CTR.

When a specific gate line is opened by the gate driving circuit GDC, the data driving circuit DDC converts the image data DATA received from the controller CTR into an analog data voltage and supplies the analog data voltage to the plurality of data lines DL.

The data driving circuit DDC may be positioned on only one side (e.g., the top or bottom side) of the display panel PNL and, in some cases, the data driver DDR may be positioned on each of two opposite sides (e.g., both the top and bottom sides) of the display panel PNL depending on, e.g., driving schemes or panel designs.

The gate driving circuit GDC may be positioned on only one side (e.g., the left or right side) of the display panel PNL and, in some cases, the gate driving circuit GDR may be positioned on each of two opposite sides (e.g., both the left and right sides) of the display panel PNL depending on, e.g., driving schemes or panel designs.

The plurality of gate lines GL disposed on the display panel PNL may include a plurality of scan lines SCL, a plurality of sense lines SENL, and a plurality of emission control lines EML. The scan line SCL, sense line SENL, and emission control line EML are lines for transferring different types of gate signals (scan signals, sense signals, and emission control signals) to the gate nodes of different types of transistors (scan transistors, sense transistors, and emission control transistors).

Figure 2:
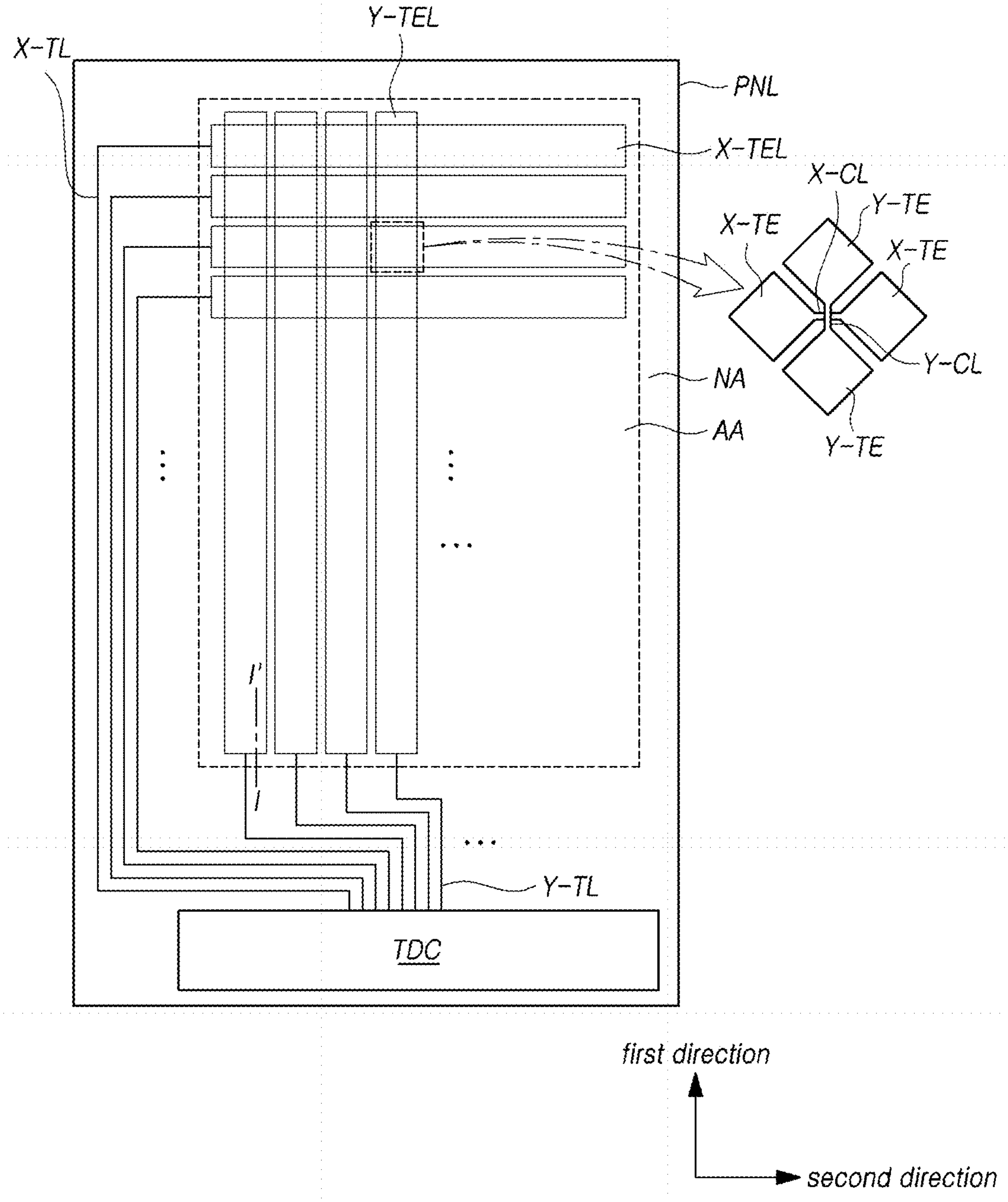
FIG. 2 is a view illustrating an example of a touch sensor structure included in a display device according to aspects of the present disclosure.
Figure 3:
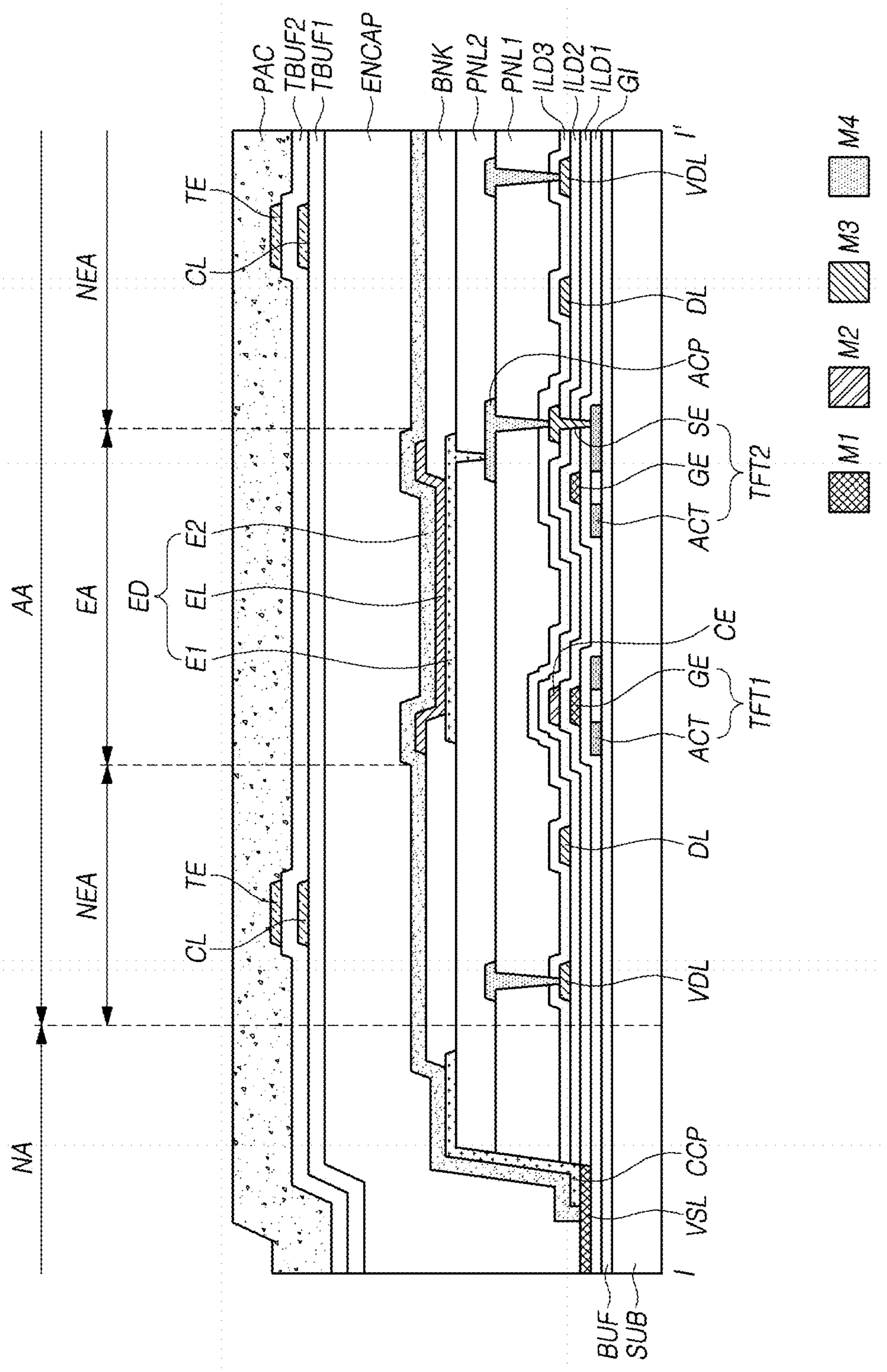
FIG. 3 is a cross-sectional view illustrating an example structure, taken along line I-I' of FIG. 2.

FIG. 2 is a view illustrating an example of a touch sensor structure included in a display device 100 according to aspects of the present disclosure. FIG. 3 is a cross-sectional view illustrating an example structure, taken along line I-I' of FIG. 2.

Referring to FIG. 2, the display device 100 may include a plurality of touch electrode lines TEL and a plurality of touch routing lines TL disposed on the display panel PNL. The display device 100 may include a touch driving circuit TDC that drives a plurality of touch electrode lines TEL and a plurality of touch routing lines TL.

Each of the plurality of touch electrode lines TEL may be electrically connected to the touch driving circuit TDC through a touch routing line TL. The touch driving circuit TDC may be disposed separately and, in some cases, be integrated with a circuit for display driving. For example, the touch driving circuit TDC may be integrated with the data driving circuit DDC.

Each of the plurality of touch electrode lines TEL may include a plurality of touch electrodes TE electrically connected to each other along one direction. Further, each of the plurality of touch electrode lines TEL may include a plurality of touch electrode connection patterns CL electrically connecting the plurality of touch electrodes TE to each other.

For example, each of the plurality of X-touch electrode lines X-TEL may include a plurality of X-touch electrodes X-TE arranged along a first direction and a plurality of X-touch electrode connection patterns X-CL electrically connecting the plurality of X-touch electrodes X-TE.

For example, each of the plurality of Y-touch electrode lines Y-TEL may include a plurality of Y-touch electrodes Y-TE arranged along a second direction crossing the first direction and a plurality of Y-touch electrode connection patterns Y-CL electrically connecting the plurality of Y-touch electrodes Y-TE.

The X-touch electrode line X-TEL and the Y-touch electrode line Y-TEL may be disposed on different layers. Alternatively, the X-touch electrodes X-TE and Y-touch electrodes Y-TE may be disposed on the same layer. In this case, either the X-touch electrode connection pattern X-CL or the Y-touch electrode connection pattern Y-CL may be disposed on a different layer from the touch electrode TE.

For example, the touch electrode TE may have a rectangular shape, but is not limited thereto.

The touch electrode TE may be formed of a transparent conductive material and may be disposed without interfering with the image display function of the display panel PNL.

Alternatively, the touch electrode TE may be formed of an opaque metal. In this case, the touch electrode TE may have an open area corresponding to the emission area of the light emitting element ED disposed on the display panel PNL. For example, the touch electrode TE may be implemented in a mesh shape and disposed to avoid the emission area.

Referring to FIG. 3, the substrate SUB may include an active area AA where a plurality of subpixels SP are disposed and a non-active area NA positioned outside the active area AA.

The active area AA may include an emission area EA where light is emitted by the light emitting element ED and a non-emission area NEA that is an area other than the emission area EA.

A buffer layer BUF may be disposed on the substrate SUB.

A thin film transistor TFT may be disposed on the buffer layer BUF.

The thin film transistor TFT may include an active layer ACT and a gate electrode GE. The thin film transistor TFT may include a source electrode SE and a drain electrode (not shown).

The active layer ACT may be positioned on the buffer layer BUF. The active layer ACT may be formed of a semiconductor material. The active layer ACT may be formed of amorphous silicon or polycrystalline silicon.

A gate insulation layer GI may be disposed on the active layer ACT.

The gate electrode GE may be positioned on the gate insulation layer GI. The gate electrode GE may be disposed using the first metal layer M1.

Several signal lines may be disposed using the first metal layer M1.

For example, the second power line VSL supplying the second driving voltage VSS may be disposed using the first metal layer M1.

The second power line VSL may be positioned in the non-active area NA. In some cases, the second power line VSL may be positioned in the active area AA.

The second power line VSL may be electrically connected to the cathode layer E2. A cathode connection pattern CCP may be positioned in at least a partial area between the second power line VSL and the cathode layer E2.

A first inter-layer insulation layer ILD1 may be disposed on the gate electrode GE.

A capacitor electrode CE may be positioned on the first inter-layer insulation layer ILD1. The capacitor electrode CE may be disposed using the second metal layer M2.

The capacitor electrode CE, together with the gate electrode GE of the first thin film transistor TFT1, may form a storage capacitor Cstg. The first thin film transistor TFT1 may be, e.g., the driving transistor DRT shown in FIG. 2.

A second inter-layer insulation layer ILD2 may be disposed on the capacitor electrode CE.

A source electrode SE may be positioned on the second inter-layer insulation layer ILD2. The source electrode SE may be electrically connected to the active layer ACT through a contact hole. The source electrode SE may be disposed using the third metal layer M3.

Several signal lines may be disposed using the third metal layer M3.

For example, the data line DL for supplying the data voltage Vdata may be disposed using the third metal layer M3. The first power line VDL for supplying the first driving voltage VDD may be disposed using the third metal layer M3.

A portion of the first power line VDL may be positioned in the active area AA. In some cases, the first power line VDL may be positioned in the non-active area NA.

The data line DL, the first power line VDL, and the second power line VSL may be disposed in various ways by using at least a portion of several metal layers.

FIG. 3 illustrates an example in which the data line DL and the first power line VDL are disposed using the third metal layer M3, but the data line DL and the first power line VDL may be disposed using the metal layer M1 or the second metal layer M2.

Further, as in the example shown in FIG. 3, the first power line VDL may include a portion formed of the third metal layer M3 and a portion formed of the fourth metal layer M4. Accordingly, the resistance of the first power line VDL may be reduced.

A third inter-layer insulation layer ILD3 may be disposed on the third metal layer M3.

A first planarization layer PLN1 may be disposed on the third inter-layer insulation layer ILD3. The first planarization layer PLN1 may be formed of, e.g., an organic material.

A fourth metal layer M4 may be positioned on the first planarization layer PLN1.

A portion of the first power line VDL may be disposed using the fourth metal layer M4.

An anode connection pattern ACP may be disposed using the fourth metal layer M4. The second thin film transistor TFT2 and the light emitting element ED may be electrically connected by the anode connection pattern ACP.

A second planarization layer PLN2 may be disposed on the fourth metal layer M4. The second planarization layer PLN2 may be formed of, e.g., an organic material.

A light emitting element ED may be disposed on the second planarization layer PLN2.

The anode layer E1 of the light emitting element ED may be positioned on the second planarization layer PLN2.

A bank layer BNK may be disposed on the second planarization layer PLN2 while exposing a portion of the anode layer E1.

A light emitting layer EL may be positioned on the anode layer E1. The light emitting layer EL may be positioned on a portion of the bank layer BNK.

A cathode layer E2 may be positioned on the light emitting layer EL and the bank layer BNK.

An emission area EA may be determined by the bank layer BNK.

An encapsulation layer ENCAP may be disposed on the light emitting element ED. The encapsulation layer ENCAP may be formed of a single layer or multiple layers. For example, the encapsulation layer ENCAP may include a first inorganic layer, an organic layer, and a second inorganic layer.

A touch sensor structure may be disposed on the encapsulation layer ENCAP.

For example, the touch buffer layer TBUF may be positioned on the encapsulation layer ENCAP. The touch buffer layer TBUF may be formed of, e.g., an inorganic material. In some cases, the touch buffer layer TBUF may not be disposed. In this case, the electrode included in the touch sensor structure may be directly disposed on the encapsulation layer ENCAP.

A touch electrode connection pattern CL may be positioned on the touch buffer layer TBUF.

A touch insulation layer TILD may be positioned on the touch electrode connection pattern CL. The touch insulation layer TILD may be an organic material or an inorganic material. When the touch insulation layer TILD is an organic material, a layer formed of an inorganic material may be further disposed between the touch insulation layer TILD and the touch electrode connection pattern CL.

The touch electrode TE may be positioned on the touch insulation layer TILD.

An insulation film PAC may be disposed on the touch electrode TE.

Since the touch electrode TE and the touch electrode connection pattern CL are disposed using a plurality of layers, it is possible to easily implement the touch sensor structure that include the X-touch electrode line X-TEL and the Y-touch electrode line Y-TEL.

The touch electrode TE and the touch electrode connection pattern CL may be disposed while avoiding the emission area EA. The touch electrode TE and the touch electrode connection pattern CL may overlap with the non-emission area NEA.

Since the touch electrode TE and the touch electrode connection pattern CL are disposed on the encapsulation layer ENCAP and are positioned to avoid the emission area EA, a touch sensor structure may be included in the display panel PNL without affecting the image display function of the display panel PNL.

Although not shown in FIG. 3, a touch routing line TL connected to the touch electrode TE may be disposed along an inclined surface of the encapsulation layer ENCAP. The touch routing line TL may be positioned on the same layer as the touch electrode TE and may be positioned on the same layer as the touch electrode connection pattern CL. Alternatively, the touch routing line TL may be disposed using the two layers. The touch routing line TL may be electrically connected to the pad positioned in the non-active area NA.

In a structure in which a plurality of X-touch electrode lines X-TEL and a plurality of Y-touch electrode lines Y-TEL are disposed to cross each other, the touch driving circuit TDC may perform touch sensing while driving the touch electrode line TEL through the touch routing line TL.

For example, either the X-touch electrode line X-TEL or the Y-touch electrode line Y-TEL may be a touch driving electrode to which a touch driving signal is applied. The other of the X-touch electrode line X-TEL and the Y-touch electrode line Y-TEL may be a touch sensing electrode from which a touch sensing signal is detected.

The touch driving circuit TDC may detect a change in mutual capacitance that occurs when the user touches in a state in which different signals are applied to the X-touch electrode line X-TEL and the Y-touch electrode line Y-TEL.

The touch driving circuit TDC may transfer sensing data according to the detected change in mutual capacitance to the touch controller. The touch controller may detect whether a touch occurs on the display panel PNL and touch coordinates based on the sensing data received from the touch driving circuit TDC.

The touch electrode line TEL disposed on the display panel PNL may be divided and disposed in a plurality of areas in the active area AA.

Since the touch electrode line TEL is divided and disposed for each area, the load of the touch electrode line TEL may be reduced. When the area of the display panel PNL is increased, the load of the touch electrode line TEL may be reduced and touch sensing performance may be enhanced.

Further, the display device 100 according to aspects of the present disclosure may include a structure capable of preventing interference between the touch electrode TE and an electrode for driving the display and reducing noise of the touch sensing signal.

Figure 4:
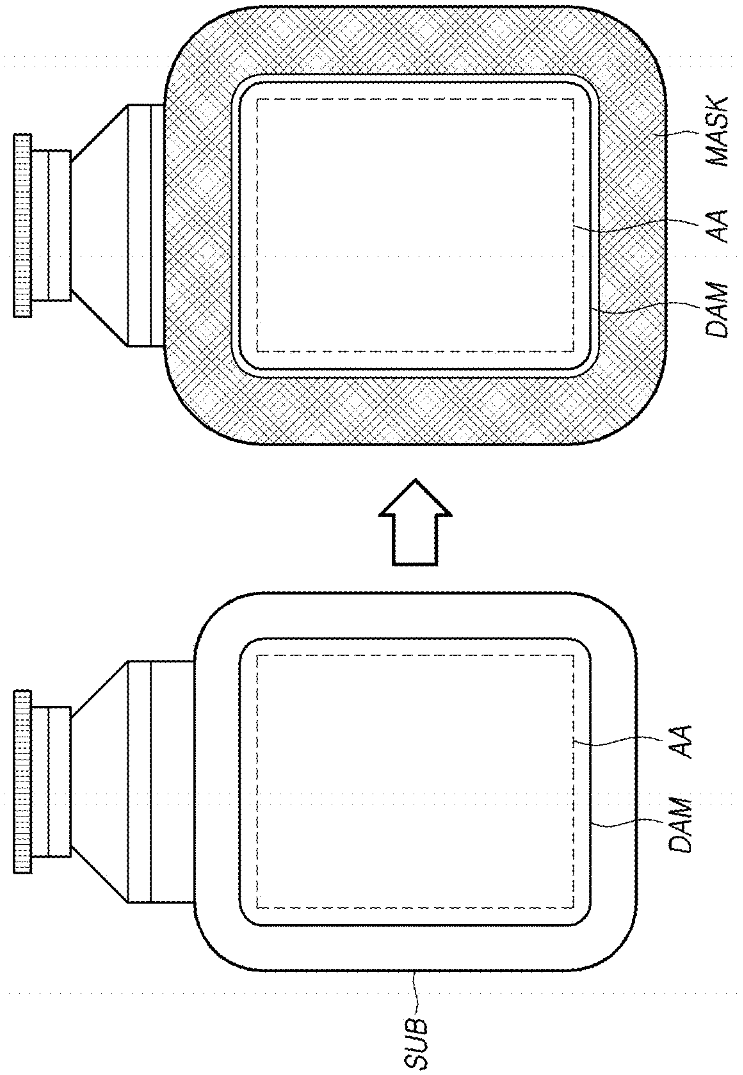
FIGS. 4 and 5 are views illustrating a manufacturing process of a display device according to aspects of the present disclosure.

FIG. 4 is a plan view illustrating a display device according to aspects of the present disclosure. More specifically, FIG. 4 is a view illustrating a manufacturing process using a mask in a manufacturing process of a display device according to aspects of the present disclosure.

Referring to FIG. 4, a display device according to aspects of the present disclosure may include a substrate SUB including an active area AA and a dam DAM positioned on the marginal portion of the substrate SUB.

A mask MASK may be used to form an insulation layer or a conductive layer of the display device. In the manufacturing process of the display device, the mask MASK may be aligned with respect to the dam DAM as shown in FIG. 4. However, in the process of aligning the mask as shown in FIG. 4, static electricity may be generated due to a foreign object from contact of the mask, or arcing may occur due to deflection of plasma.

Figure 5:
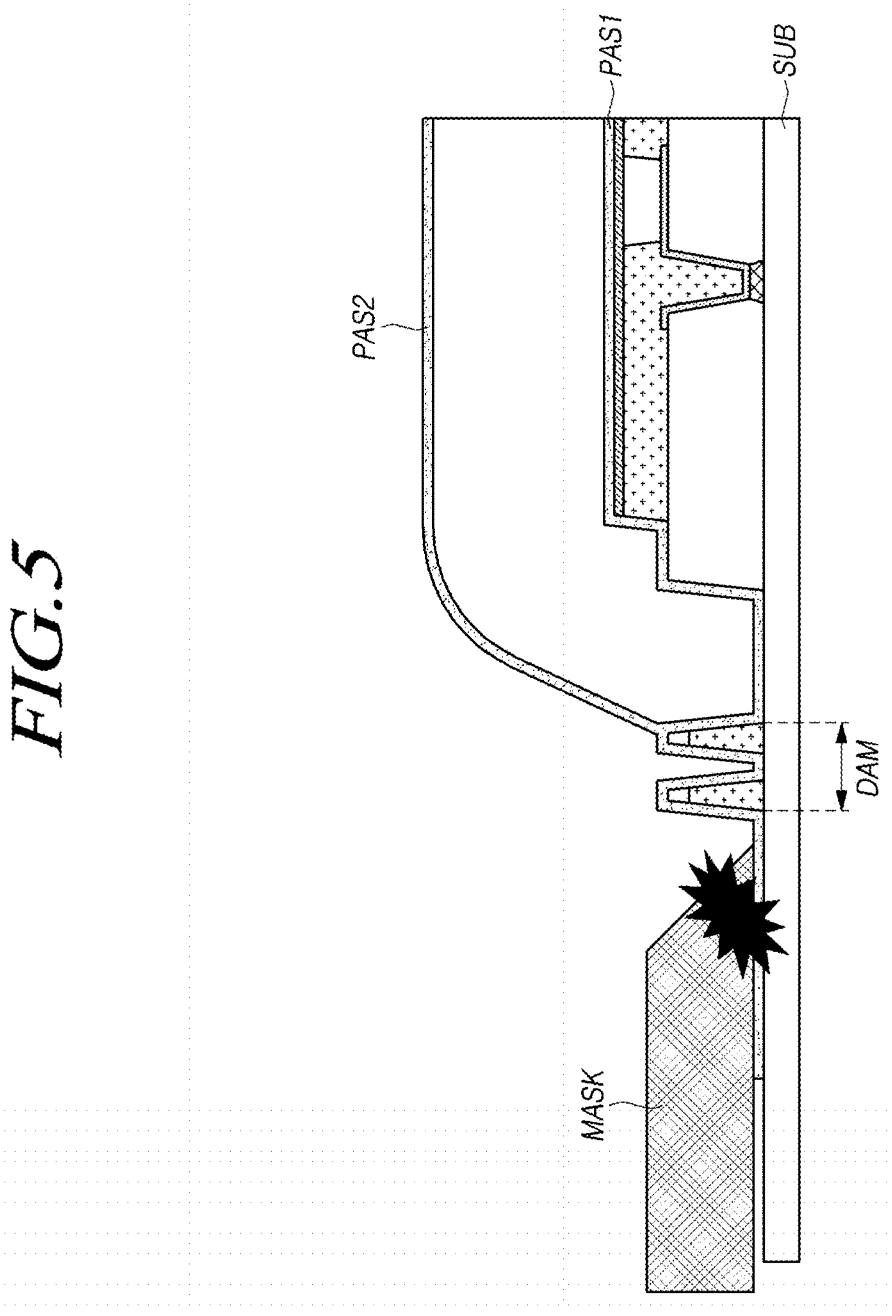

FIG. 5 is a cross-sectional view illustrating a display device according to aspects of the present disclosure. More specifically, FIG. 5 is a view illustrating issues that may occur in the manufacturing process using a mask.

Referring to FIG. 5, a display device according to aspects of the present disclosure may include a substrate SUB and a dam DAM positioned on the marginal portion of the substrate SUB. The dam DAM may be positioned on the substrate SUB and may have a shape protruding from the substrate SUB. The dam DAM may be formed prior to the process of manufacturing the first passivation layer PAS1 and the second passivation layer PAS2.

The process of forming the first passivation layer PAS1 and the process of forming the second passivation layer PAS2 may use a mask MASK. Since the dam DAM has a shape protruding from the substrate SUB, the mask MASK may contact the dam DAM or the display device outside the dam DAM in the process of forming the first passivation layer PAS1 or the second passivation layer PAS2 using the mask MASK, causing a defect attributed to a foreign body.

Or, even when the mask MASK does not directly contact the display device, if the distance between the mask MASK and the inorganic film formed in the display device is several μm to several tens of μm, arcing may occur due to deflection of plasma.

The inventors of the present disclosure have invented a display device including an outer discharge line, an inner discharge line, a discharge link, and a static electricity discharge circuit to address the issues.

Figure 6:
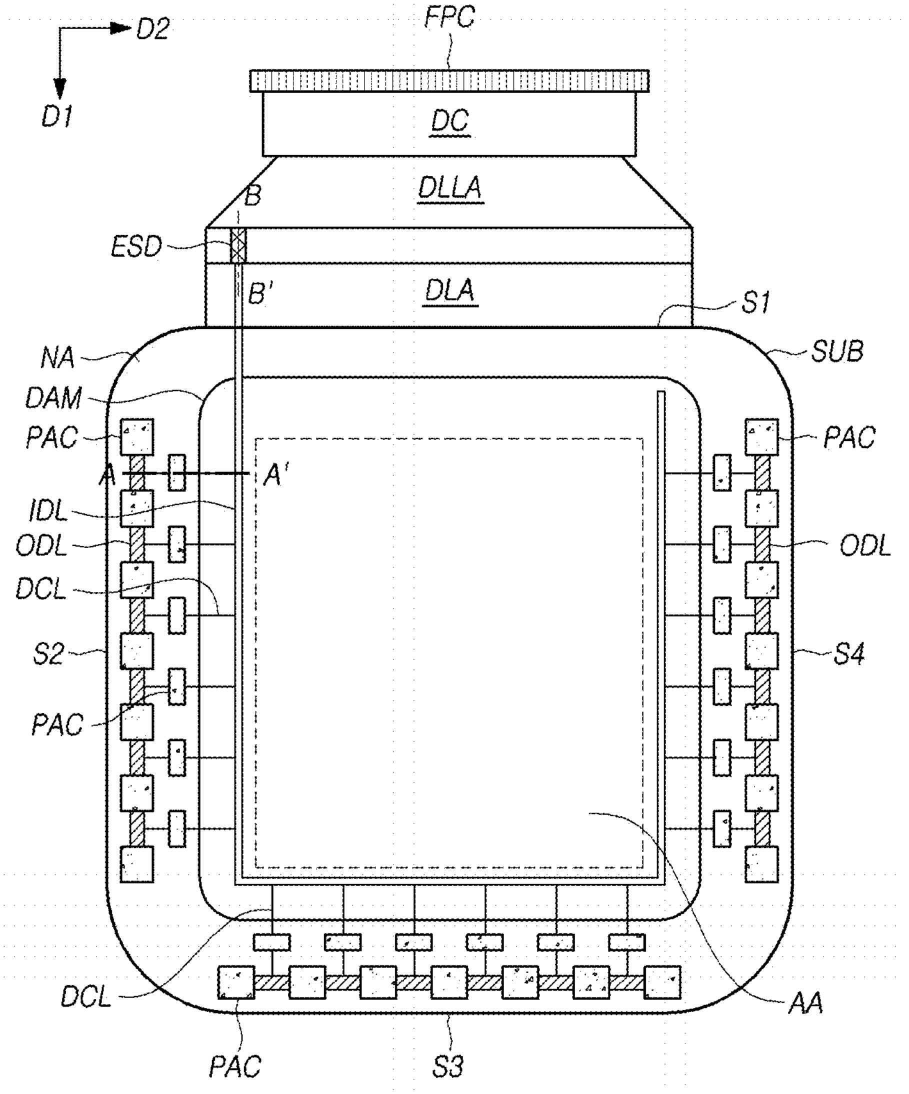
FIG. 6 is a plan view illustrating a display device according to aspects of the present disclosure.

FIG. 6 is a plan view illustrating a display device according to aspects of the present disclosure.

Referring to FIG. 6, a display device according to aspects of the present disclosure may include a substrate SUB, a dam DAM, an outer discharge line ODL, an inner discharge line IDL, a discharge link DCL, and a static electricity discharge circuit ESD.

The substrate SUB may include an active area AA. The active area AA may be positioned in the chief portion of the substrate SUB. The substrate SUB may include a non-active area NA. The non-active area NA is an area other than the active area AA and may be an area surrounding the active area AA.

The dam DAM may be positioned on the marginal portion of the substrate SUB. The dam DAM may surround the active area AA positioned in the chief portion of the substrate SUB. The dam DAM may be positioned in the non-active area NA. The dam DAM may support the organic film constituting the encapsulation layer of the display device.

The outer discharge line ODL may be positioned outside the dam DAM. In other words, the outer discharge line ODL may be positioned on the substrate SUB and may be positioned on a portion of the substrate SUB that is a more marginal portion than the dam DAM. In other words, the outer discharge line ODL may be positioned in an area which is the non-active area NA on the substrate SUB and outside the dam DAM. The outer discharge line ODL may be positioned in the non-active area NA.

The outer discharge line ODL may have a dashed line shape. More specifically, the outer discharge line ODL may have a dashed line shape broken by the insulation film PAC. The insulation film PAC may be positioned between sections of the dashed line-shaped outer discharge lines ODL.

The display device may include a plurality of outer discharge lines ODL. For example, the display device may include three dashed line-shaped outer discharge lines ODL. Each outer discharge line ODL may be positioned adjacent to one side surface of the substrate SUB. For example, the display device may include an outer discharge line ODL adjacent to the second side surface S2, an outer discharge line ODL adjacent to the third side surface S3, and an outer discharge line ODL adjacent to the fourth side surface S4. The first side surface S1 may refer to one side surface of the substrate SUB where the static electricity discharge circuit ESD is positioned. The third side surface S3 may be a side opposite to the one side of the substrate SUB where the static electricity discharge circuit ESD is positioned. The second side surface S2 and the fourth side surface S4 may refer to the remaining side surfaces other than the first side surface S1 and the third side surface S3.

For example, the outer discharge lines ODL may be positioned adjacent to the other three sides than one side of the substrate SUB where the driving circuit DC is positioned. As the outer discharge lines ODL are positioned as described above, it is possible to more effectively prevent arcing during the process.

The outer discharge line ODL and the adjacent discharge link DCL may be positioned substantially perpendicular to each other. For example, the discharge link DCL may be positioned adjacent to the outer discharge line ODL extending in a first direction D1 and extend in a second direction D2 perpendicular to the first direction D1. Further, the discharge link DCL may be positioned adjacent to the outer discharge line ODL extending in the second direction D2 and extend in the first direction D1 perpendicular to the second direction D2.

The inner discharge line IDL may be positioned inside the dam DAM. In other words, the inner discharge line IDL may be positioned on the substrate SUB and may be positioned on a portion of the substrate SUB that is a more chief portion than the dam DAM. In other words, the inner discharge line IDL may be positioned in an area which is the non-active area NA on the substrate SUB and inside the dam DAM. The inner discharge line IDL may be positioned in the non-active area NA.

The inner discharge line IDL may be in the form of one continuous line. For example, the inner discharge line IDL may be in the form of one continuous line positioned on the other three side surfaces of the substrate SUB except for one side where the driving circuit DC is positioned. The inner discharge line IDL may be in the form of one continuous line positioned on the second side surface S2, the third side surface S3, and the fourth side surface S4.

As the inner discharge lines IDL are positioned as described above, it is possible to more effectively prevent arcing during the process.

The inner discharge line IDL may contact the discharge link DCL. By contacting the discharge link DCL, the inner discharge line IDL may receive the current from the discharge link DCL, so that defects due to arcing may be prevented.

The inner discharge line IDL may be electrically connected to the static electricity discharge circuit ESD. That the inner discharge line IDL is electrically connected to the static electricity discharge circuit ESD may mean that the inner discharge line IDL contacts the conductive layer constituting the static electricity discharge circuit ESD. As the inner discharge line IDL is electrically connected to the static electricity discharge circuit ESD, the inner discharge line IDL may transfer the current received through the discharge link DCL to the static electricity discharge circuit ESD, thereby preventing defects due to arcing.

The discharge link DCL may overlap with the dam DAM from the side of the outer discharge line ODL. In other words, the discharge link DCL may be positioned to overlap with the dam DAM from an outer portion of the dam DAM where the outer discharge line ODL is positioned. That the discharge link DCL overlap withs the dam DAM may mean that the discharge link DCL is positioned to be able to pass from the outside of the dam DAM to the inside of the dam DAM.

The discharge link DCL may contact the inner discharge line ODL. As the discharge link DCL contacts the inner discharge line ODL, the discharge link DCL may be electrically connected to the inner discharge line ODL. Since static electricity and plasma may flow through the discharge link DCL and the inner discharge line ODL, defects due to static electricity or arcing may be prevented.

The static electricity discharge circuit ESD may be a circuit for protecting the circuitry of the display device from static electricity that may occur while the display device is manufactured or used. A specific configuration of the static electricity discharge circuit ESD is not particularly limited, and may be one that may be used for discharging static electricity in the technical field of the present disclosure.

The static electricity discharge circuit ESD may be positioned on one side surface of the substrate SUB. More specifically, the static electricity discharge circuit ESD may be positioned on one side surface of the substrate SUB where the driving circuit DC is positioned. For example, the static electricity discharge circuit ESD may be positioned between a plurality of data lines DL and data line link portions DLL.

The static electricity discharge circuit ESD may be electrically connected to the inner discharge line IDL. As the static electricity discharge circuit ESD is electrically connected to the inner discharge line IDL, defects due to static electricity or arcing may be prevented.

The driving circuit DC may be positioned on one side surface of the substrate SUB. For example, the driving circuit DC may be positioned on the first side surface S1 of the substrate SUB. The driving circuit DC may be positioned somewhat differently depending on how to mount the driving circuit DC on the substrate SUB. For example, when the driving circuit DC is mounted in a chip-on-glass (COG) scheme, the driving circuit DC may be positioned adjacent to the first side surface S1 of the substrate SUB, on the substrate SUB. When the driving circuit DC is mounted in a chip-on-film (COF) scheme, the driving circuit DC may be positioned on the first side surface S1 of the substrate SUB, but the driving circuit DC may be positioned on a separate polymer film positioned on the first side surface S1 of the substrate SUB, rather than being positioned on the substrate SUB. When the driving circuit DC is mounted in a chip-on-plastic (COP) scheme, the driving circuit DC may be positioned adjacent to the first side surface S1 of the board SUB and on the substrate SUB. The driving circuit DC may be, e.g., the data driving circuit DDC described above with reference to FIG. 1.

The data line area DLA may be a non-active area NA and an area where a plurality of data lines are positioned. The plurality of data lines may be positioned to extend in the first direction D1. The data line may be positioned to extend in the first direction D1 from the side of the driving circuit DC to the active area AA.

The data line link area DLLA may be a non-active area NA and an area where a plurality of data line links are positioned. The data line link area DLLA may be positioned between the driving circuit DC and the data line area DLA. A data line link is a line through which data line signals are transferred, and may refer to a plurality of lines positioned between the driving circuit DC and the data line area DLA.

The display device may include a flexible printed circuit FPC. The flexible printed circuit FPC may be positioned adjacent to the static electricity discharge circuit ESD. In other words, the flexible printed circuit FPC may be positioned on the first side surface S1 of the substrate SUB.

Figure 7:
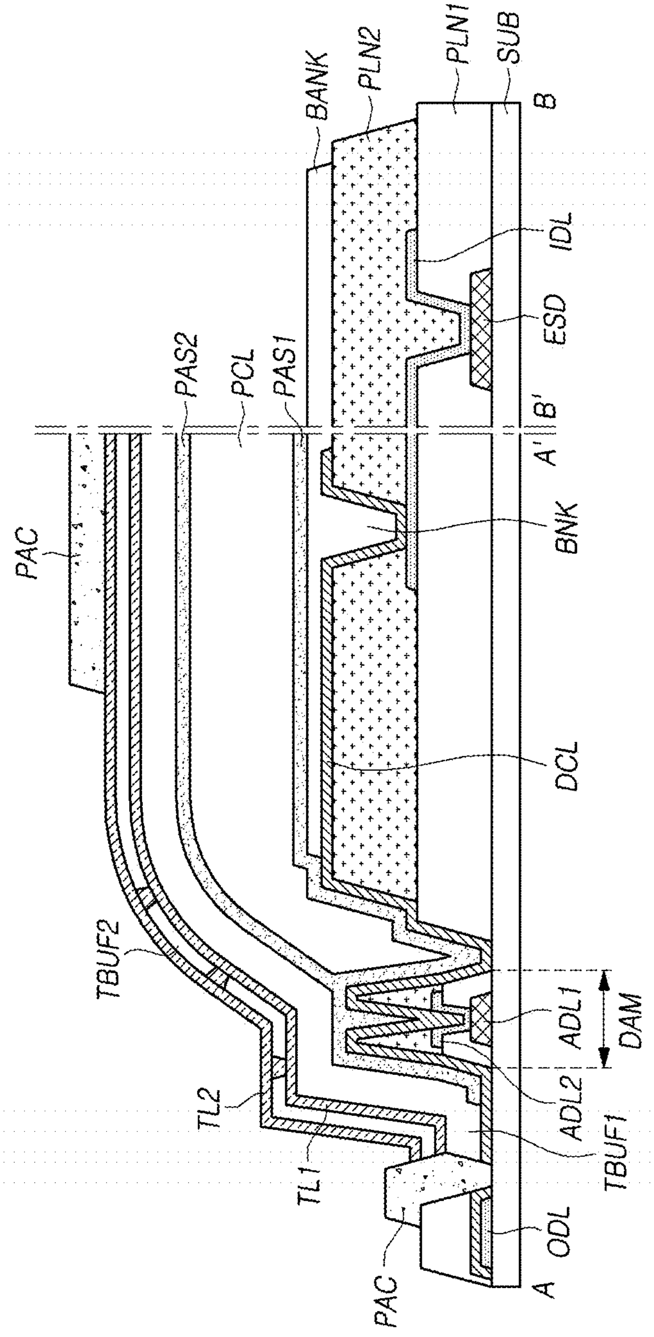
FIGS. 7 and 8 are cross-sectional views illustrating a display device according to aspects of the present disclosure.

FIG. 7 is a cross-sectional view illustrating a display device according to aspects of the present disclosure. More specifically, FIG. 7 is a cross-sectional view taken along line A-B of the display device of FIG. 6.

Referring to FIG. 7, the outer discharge line ODL may be positioned on the substrate SUB. The outer discharge line ODL may be, e.g., the same material layer as the layer constituting the pad electrode positioned in the pad portion of the display device.

The static electricity discharge circuit ESD may be positioned on the substrate SUB. The static electricity discharge circuit ESD may be the same material layer as a layer constituting various circuit elements or lines included in the display device. For example, the static electricity discharge circuit ESD may be the same material layer as a layer constituting the source-drain or gate electrode of the transistor included in the display device. The static electricity discharge circuit ESD means a circuit capable of discharging static electricity in the technical field of the present disclosure, and may denote a circuit composed of the same material layer as the layer constituting the source-drain or gate electrode of the transistor positioned in the active area AA.

The inner discharge line IDL may be positioned on the first planarization layer PLN1. The inner discharge line IDL may be the same material layer as a layer constituting various circuit elements or lines included in the display device. For example, the inner discharge line IDL may be the same material layer as a layer constituting the source-drain or gate electrode of the transistor included in the display device.

The first planarization layer PLN1 may be positioned on the substrate SUB. The first planarization layer PLN1 may be an inorganic layer or an organic layer. The first planarization layer PLN1 may be a layer for planarizing various circuit elements and lines positioned on the substrate SUB.

The discharge link DCL may be positioned on the second planarization layer PLN2. The discharge link DCL may be, e.g., the same material layer as the cathode electrode or anode electrode included in the light emitting element of the display device. The discharge link DCL may include a transparent conductive material. The discharge link DCL may include one or more of, e.g., indium tin oxide (ITO), graphene, PEDOT:PSS(Poly(3,4-ethylenedioxythiophene): poly(styrenesulfonate)) and silver nanowire, carbon nanotube (CNT). For example, the discharge link DCL may include indium tin oxide ITO.

The second planarization layer PLN2 may be positioned on the first planarization layer PLN1 and the inner discharge line IDL. The second planarization layer PLN2 may be an inorganic layer or an organic layer. The second planarization layer PLN2 may be a layer for planarizing various circuit elements and lines positioned on the first planarization layer PLN1.

The display device may include a first auxiliary discharge line ADL1 and a second auxiliary discharge line ADL2.

The first auxiliary discharge line ADL1 may be positioned on the substrate SUB. The first auxiliary discharge line ADL1 may be positioned to overlap with the dam DAM. Referring to FIGS. 6 and 7, the first auxiliary discharge line ADL1 may be positioned on the second side surface S2, the third side surface S3, and the fourth side surface S4 of the substrate SUB. The first auxiliary discharge line ADL1 may not be positioned on the first side surface S1 of the substrate SUB. In other words, the first auxiliary discharge line ADL1 may be positioned to overlap with the dam DAM positioned adjacent to the second side surface S2, the third side surface S3, and the fourth side surface S4.

The second auxiliary discharge line ADL2 may be positioned on the first planarization layer PLN1 over the substrate SUB. The second auxiliary discharge line ADL2 may be positioned to overlap with the dam DAM. Referring to FIGS. 6 and 7, the second auxiliary discharge line ADL2 may be positioned on the second side surface S2, the third side surface S3, and the fourth side surface S4 of the substrate SUB. The second auxiliary discharge line ADL2 may not be positioned on the first side surface S1 of the substrate SUB. In other words, the second auxiliary discharge line ADL2 may be positioned to overlap with the dam DAM positioned adjacent to the second side surface S2, the third side surface S3, and the fourth side surface S4.

The second auxiliary discharge line ADL2 may be positioned on the first auxiliary discharge line ADL1. The second auxiliary discharge line ADL2 may contact the first auxiliary discharge line ADL1 through the contact hole. In other words, the second auxiliary discharge line ADL2 may contact the first auxiliary discharge line ADL1 through the contact hole of the first planarization layer PLN1 in the dam DAM. As the second auxiliary discharge line ADL2 contacts the first auxiliary discharge line ADL1, it is possible to more effectively remove the static electricity and deflection of plasma that may occur due to a foreign object in the manufacturing process.

The discharge link DCL may be positioned on the second auxiliary discharge line ADL2. In other words, the discharge link DCL may be positioned to extend from the side of the outer discharge line ODL through the second auxiliary discharge line ADL2 overlapping with the dam DAM to the side of the inner discharge line IDL. The discharge link DCL may contact the second auxiliary discharge line ADL2. In other words, the discharge link DCL may contact the second auxiliary discharge line ADL2 through the contact hole in the dam DAM. As the discharge link DCL contacts the second auxiliary discharge line ADL2, the discharge link DCL, the second auxiliary discharge line ADL2, and the first auxiliary discharge line ADL1 may be electrically connected. Therefore, it is possible to effectively prevent defects due to static electricity caused by foreign objects and arcing due to deflection of plasma during the manufacturing process.

The outer discharge line ODL may be the same material layer as the inner discharge line IDL. That the outer discharge line ODL and the inner discharge line IDL are the same material layer may mean that the outer discharge line ODL and the inner discharge line IDL are formed by the same patterning process. Or, it may mean that the inner discharge line IDL and the outer discharge line ODL are formed of substantially the same material.

The first auxiliary discharge line ADL1 may be the same material layer as the static electricity discharge circuit ESD. That the first auxiliary discharge line ADL1 and the static electricity discharge circuit ESD are the same material layer may mean that the first auxiliary discharge line ADL1 and the static electricity discharge circuit ESD are formed by the same patterning process. Or, it may mean that the first auxiliary discharge line ADL1 and the static electricity discharge circuit ESD are formed of substantially the same material.

The second auxiliary discharge line ADL2 may be the same material layer as the inner discharge line IDL. That the second auxiliary discharge line ADL2 and the inner discharge line IDL are the same material layer may mean that the second auxiliary discharge line ADL2 and the inner discharge line IDL are formed by the same patterning process. Or, it may mean that the second auxiliary discharge line ADL2 and the inner discharge line IDL are formed of substantially the same material.

The second auxiliary discharge line ADL2 may be the same material layer as the outer discharge line ODL. That the second auxiliary discharge line ADL2 and the outer discharge line ODL are the same material layer may mean that the second auxiliary discharge line ADL2 and the outer discharge line ODL are formed by the same patterning process. Or, it may mean that the second auxiliary discharge line ADL2 and the inner discharge line IDL are formed of substantially the same material.

A bank BNK may be positioned on the second planarization layer PLN2 and the discharge link DCL. The bank BNK may be a layer defining the emission area of the display device.

A first passivation layer PAS1 may be positioned on the bank BNK. The first passivation layer PAS1 may be an inorganic layer.

An organic encapsulation layer PCL may be positioned on the first passivation layer PAS1.

A second passivation layer PAS2 may be positioned on the organic encapsulation layer PCL. The second passivation layer PAS2 may be an inorganic layer.

The first passivation layer PAS1, the organic encapsulation layer PCL, and the second passivation layer PAS2 may be encapsulation layers. The encapsulation layer may be a layer for protecting the light emitting elements included in the display device from external moisture and oxygen.

A touch buffer layer TBUF may be positioned on the second passivation layer PAS2.

A first touch link TL1 may be positioned on the first touch buffer layer TBUF1. The first touch link TL1 may be a link through which touch signals are transferred.

The second touch buffer layer TBUF2 may be positioned on the first touch link TL1.

A second touch link TL2 may be positioned on the second touch buffer layer TBUF2. The second touch link TL2 may be a link through which touch signals are transferred. The second touch link TL2 may be electrically connected to the first touch link TL1.

An insulation film PAC may be positioned on the second touch link TL2. The same material layer as the insulation film PAC may be positioned on the side of the outer ground line ODL.

Figure 8:
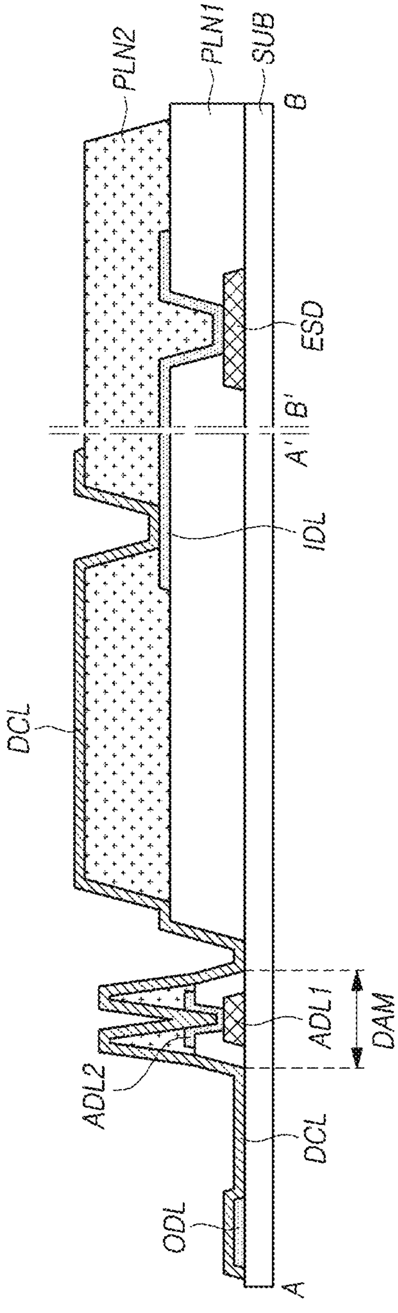

FIG. 8 is a cross-sectional view illustrating a display device according to aspects of the present disclosure. More specifically, FIG. 8 is a cross-sectional view in one step of the manufacturing process of the display device shown in FIG. 7. FIG. 8 is a cross-sectional view of the display device after forming the discharge link DCL.

Referring to FIG. 8, unlike FIG. 7, the outer discharge line ODL may directly contact the discharge link DCL, and the discharge link DCL may extend without being cut to contact the inner discharge line IDL. Therefore, it is possible to effectively discharge current caused by static electricity and deflection of plasma during the process through the outer discharge line ODL, the discharge link DCL, and the inner discharge line IDL, thereby preventing defects.

For example, the discharge link DCL may be a transparent conductive layer. When the discharge link DCL is a transparent conductive layer, resistance may be relatively higher than that of an opaque conductive layer. Therefore, as the first auxiliary discharge line ADL1 and the second auxiliary discharge line ADL2, which are opaque conductive layers, are electrically connected to the discharge link DCL in the dam (DAM), the resistance may be reduced, effectively discharging the current due to static electricity or deflection of plasma.

Figure 9:
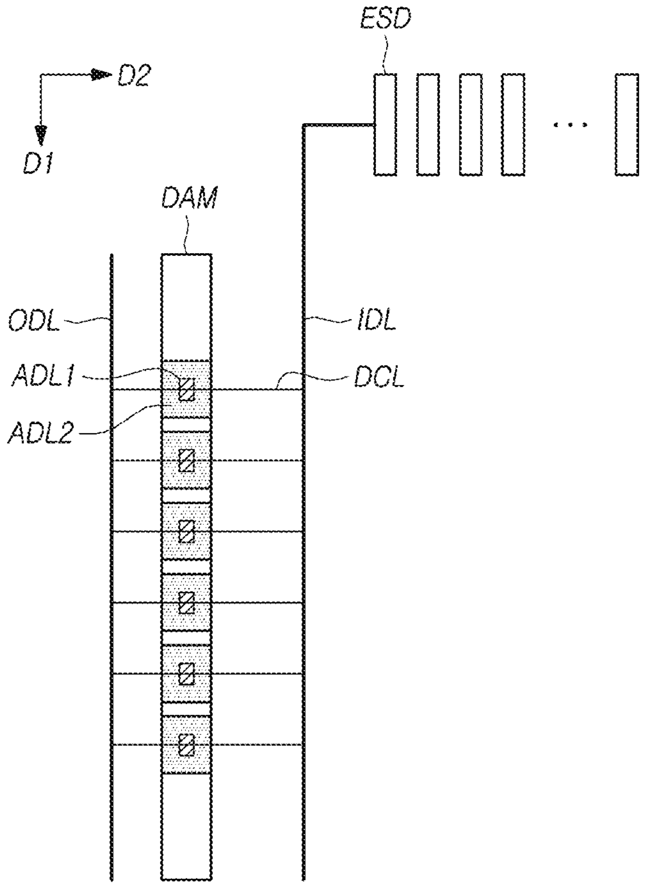
FIG. 9 is a plan view illustrating a display device according to aspects of the present disclosure.

FIG. 9 is a plan view illustrating a display device according to aspects of the present disclosure. More specifically, FIG. 9 is a plan view corresponding to the display device in the manufacturing step shown in FIG. 8.

Referring to FIG. 9, the outer discharge line ODL may extend in the first direction D1, and the discharge link DCL may extend in the second direction D2. The outer discharge line ODL may contact the discharge link DCL.

The discharge link DCL may be electrically connected to the inner discharge line IDL. The inner discharge line IDL may contact the static electricity discharge circuit ESD. As the outer discharge line ODL is electrically connected to the inner discharge line IDL connected to the static electricity discharge circuit ESD through the discharge link DCL, the current generated by static electricity or deflection of plasma may be transferred from the outer discharge circuit ODL to the static electricity discharge circuit ESD and may thus be effectively discharged.

The first auxiliary discharge line ADL1 and the second auxiliary discharge line ADL2 may be positioned to overlap with the dam DAM. Further, the first auxiliary discharge line ADL1, the second auxiliary discharge line ADL2, and the discharge link DCL may be positioned to overlap with in the dam DAM. Accordingly, the first auxiliary discharge line ADL1, the second auxiliary discharge line ADL2, and the discharge link DCL may be electrically connected to each other through contact hole in the dam DAM.

Figure 10:
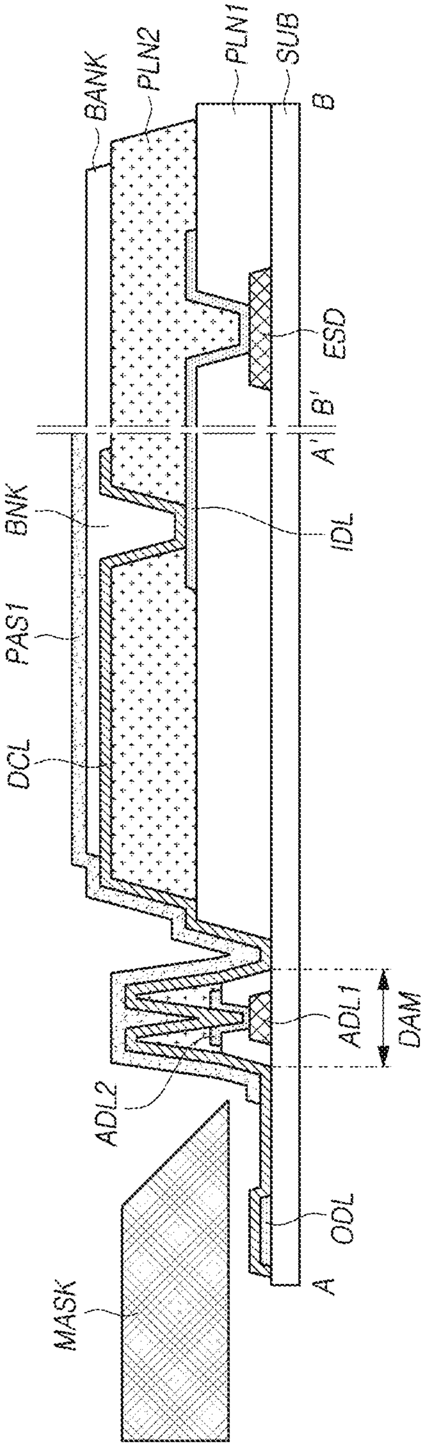
FIG. 10 is a cross-sectional view illustrating a display device according to aspects of the present disclosure.

FIG. 10 is a cross-sectional view illustrating a display device according to aspects of the present disclosure. More specifically, FIG. 10 is a cross-sectional view of the display device shown in FIG. 8 in which the first passivation layer PAS1 is deposited.

Referring to FIG. 10, the first passivation layer PAS1 may be formed by a deposition process using a mask MASK. When the deposition process is performed using the mask MASK, current may be generated by static electricity or deflection of plasma. In particular, the above-described current may be generated in the outer discharge line ODL and the dam DAM. However, according to aspects of the present disclosure, since the above-described current may be discharged by the outer discharge line ODL, the discharge link DCL, the inner discharge line IDL, and the static electricity discharge circuit ESD, defects may effectively be prevented.

Figure 11:
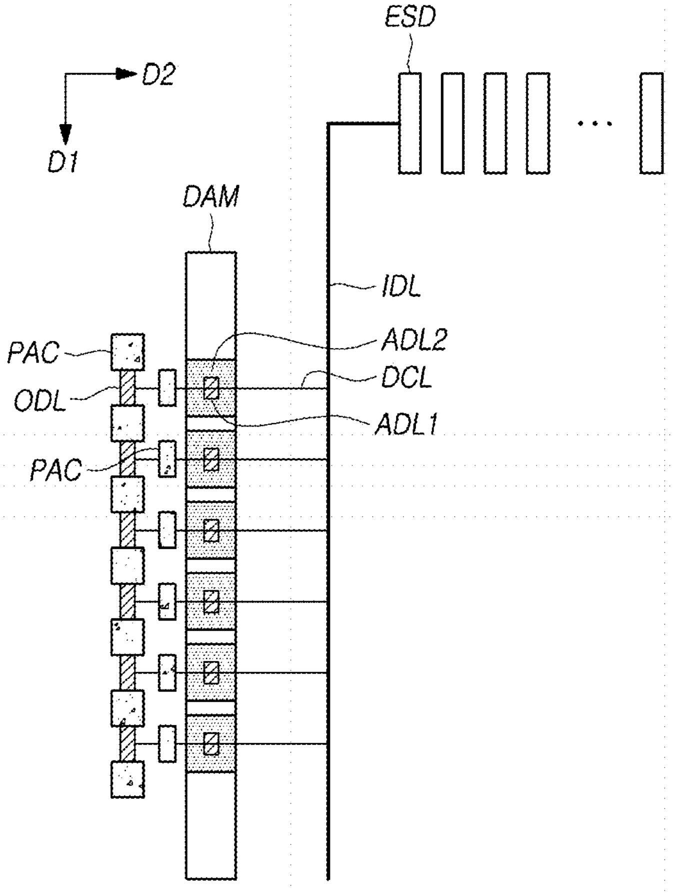
FIG. 11 is a plan view illustrating a display device according to aspects of the present disclosure.

FIG. 11 is a plan view illustrating a display device according to aspects of the present disclosure. More specifically, FIG. 11 is a plan view corresponding to FIG. 9 and is a plan view after the process of cutting the outer discharge line ODL and cutting the discharge link DCL is performed after the manufacturing process shown in FIG. 10.

Referring to FIG. 11, the outer discharge line ODL may have a dashed-line shape due to the insulation film PAC. The outer discharge line ODL may have a solid line shape as shown in FIG. 9 but, if having a solid line shape, interfere with other lines positioned in the non-display area of the display device, causing defects. If the outer discharge line ODL is cut to have a dashed line shape by the insulation film PAC as shown in FIG. 11, such defects may be prevented.

Further, the outer discharge line ODL may not be electrically connected to the discharge link DCL by the insulation film PAC. If the insulation film PAC insulates the outer discharge line ODL and the discharge link DCL, it is possible to prevent defects due to interference with other lines positioned in the non-active area.

Figure 12:
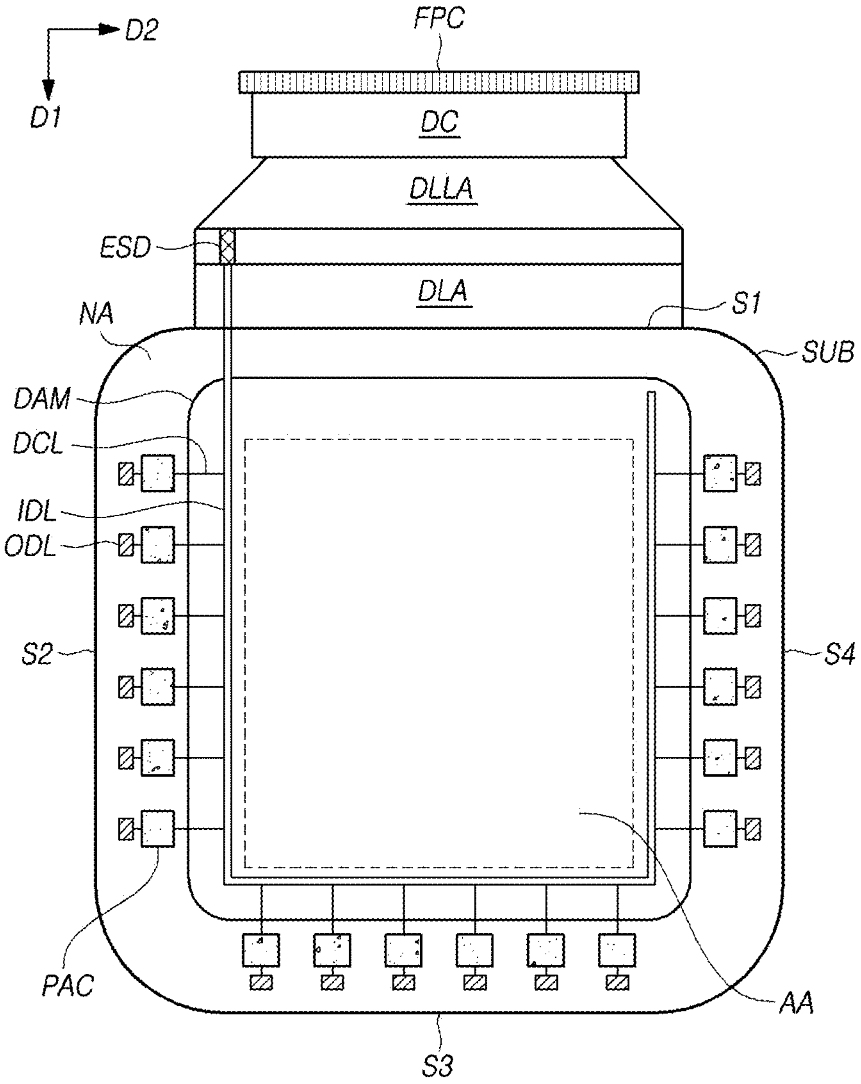
FIGS. 12, 13, and 14 are plan views illustrating a display device according to aspects of the present disclosure.

FIG. 12 is a plan view illustrating a display device according to aspects of the present disclosure. More specifically, FIG. 12 is a plan view of the display device according to other aspects different from the aspects of FIG. 6.

Unless stated otherwise, the matter for the display device according to the aspects of FIG. 12 may be the same as those of the display device described above in connection with FIGS. 6 to 11.

Referring to FIG. 12, the positions of the outer discharge line ODL and the insulation film PAC may be different from those of the display device according to the aspects of FIG. 6. More specifically, in the display device shown in FIG. 6, the insulation film PAC is positioned between the sections of the dashed line-shaped outer discharge line ODL. However, in the display device according to the aspects of FIG. 12, the insulation film PAC may not be positioned between the sections of the dashed line-shaped outer discharge line ODL. This difference may be attributed to the fact that the outer discharge line ODL is formed in the form of a patterned dashed line in the other display device according to the aspects of FIG. 12.

Figure 13:
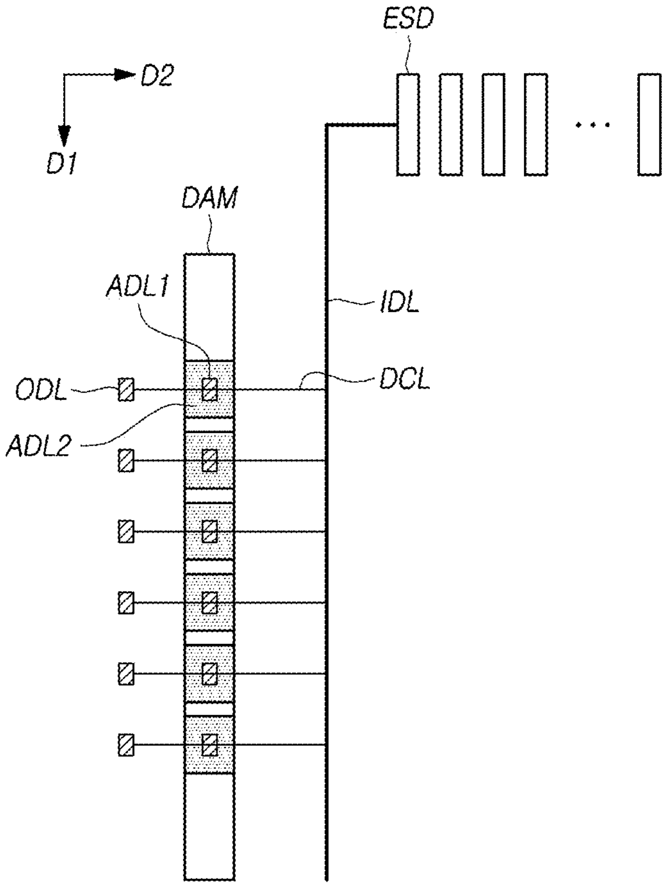

FIG. 13 is a plan view of a partial area of the display device according to the aspects of FIG. 12. More specifically, FIG. 13 may be a plan view corresponding to FIG. 9.

Referring to FIG. 13, the outer discharge line ODL may extend in the first direction D1, and the discharge link DCL may extend in the second direction D2. The outer discharge line ODL may contact the discharge link DCL.

The discharge link DCL may be connected to the inner discharge line IDL. The inner discharge line IDL may contact the static electricity discharge circuit ESD. As the outer discharge line ODL is electrically connected to the inner discharge line IDL connected to the static electricity discharge circuit ESD through the discharge link DCL, the current generated by static electricity or deflection of plasma may be transferred from the outer discharge circuit ODL to the static electricity discharge circuit ESD and may thus be effectively discharged.

The first auxiliary discharge line ADL1 and the second auxiliary discharge line ADL2 may be positioned to overlap with the dam DAM. Further, the first auxiliary discharge line ADL1, the second auxiliary discharge line ADL2, and the discharge link DCL may be positioned to overlap with in the dam DAM. Accordingly, the first auxiliary discharge line ADL1, the second auxiliary discharge line ADL2, and the discharge link DCL may be electrically connected to each other through contact hole in the dam DAM.

FIG. 13 differs from the display device according to the aspects of FIG. 9 in that the outer discharge line ODL has a dashed line form. This may mean that unlike the display device according to the aspects of FIG. 9 in which the outer discharge line ODL is cut by the insulation film PAC to have the dashed line shape, the display device according to the aspect of FIG. 13 has the outer discharge line ODL formed by patterning into a dashed line shape before the discharge link DCL is formed.

Figure 14:
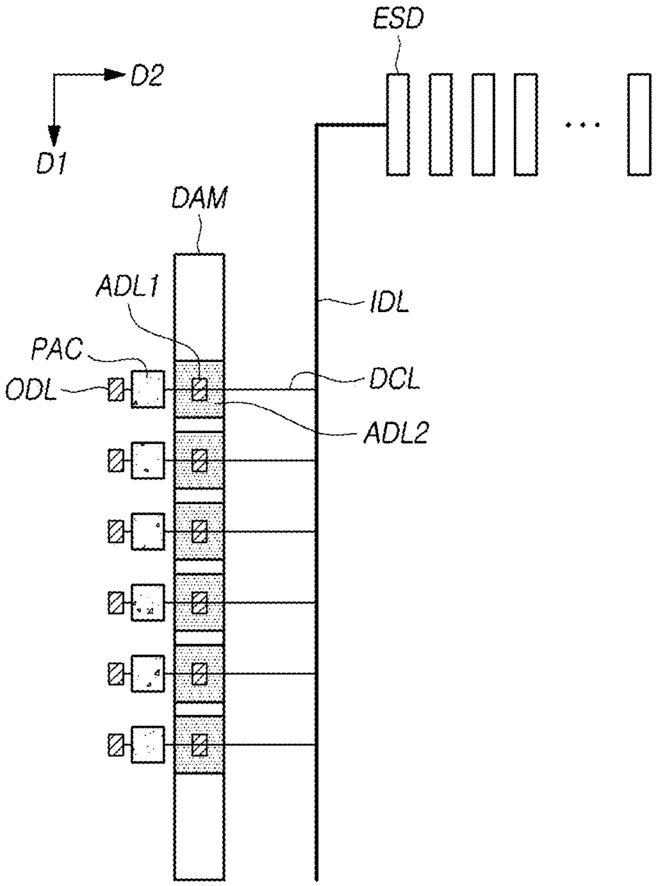

FIG. 14 is a plan view illustrating a display device according to aspects of the present disclosure. More specifically, FIG. 14 is a plan view corresponding to FIG. 13 and is a plan view after the process of cutting the discharge link DCL is performed after the manufacturing process shown in FIG. 13.

Referring to FIG. 14, the outer discharge line ODL may not be electrically connected to the discharge link DCL by the insulation film PAC. If the insulation film PAC insulates the outer discharge line ODL and the discharge link DCL, it is possible to prevent defects due to interference with other lines positioned in the non-active area.

The display device according to the aspects of FIG. 14 differs from the display device according to the aspects of FIG. 11 in that the insulation film PAC is not positioned between the sections of the dashed line-shaped outer discharge line ODL. Therefore, by having a simpler structure than that according to the aspects of FIG. 11, the display device may have a simpler structure in the non-active area, so the display device may have a thinner bezel area than that according to the aspects of FIG. 11. In the aspects of FIG. 11, since the outer discharge line ODL has a solid line shape rather than a dashed line shape in the manufacturing process step, it may more effectively discharge the current generated due to static electricity or deflection of plasma than the display device shown in FIG. 14 does.

The foregoing aspects are briefly described below.

A display device 100 may comprise a substrate SUB, a dam DAM, an outer discharge line ODL, an inner discharge line IDL, a discharge link DCL, and a static electricity discharge circuit ESD.

The dam DAM may be positioned on a marginal portion of the substrate SUB.

The outer discharge line ODL may be positioned in an outer edge of the dam DAM.

The inner discharge line IDL may be positioned in an inner edge of the dam DAM.

The discharge link DCL may pass through the dam DAM from the outer discharge line ODL side and contact the inner discharge line ODL.

The static electricity discharge circuit ESD may be electrically connected to the inner discharge line IDL.

The display device 100 may include a first auxiliary discharge line ADL1 and a second auxiliary discharge line ADL2. The first auxiliary discharge line ADL1 may be positioned to overlap with the dam DAM. The second auxiliary discharge line ADL2 may be positioned to overlap with the dam DAM.

The first auxiliary discharge line ADL1 may be positioned on the substrate SUB. The second auxiliary discharge line ADL2 may be positioned on the first auxiliary discharge line ADL1. The second auxiliary discharge line ADL2 may contact the first auxiliary discharge line ADL1. The discharge link DCL may be positioned on the second auxiliary discharge line ADL2. The discharge link DCL may contact the second auxiliary discharge line ADL2.

The outer discharge line ODL may have a dashed line shape.

The driving circuit DC may be positioned on the first side surface S1 of the substrate SUB. The data line DL may extend in the first direction D1. The data line link DLL may be positioned between the driving circuit DC and the data line DL. The static electricity discharge circuit ESD may be positioned between the data line link DLL and the data line DL.

The outer discharge line ODL may be the same material layer as the inner discharge line IDL.

The first auxiliary discharge line ADL1 may be the same material layer as the static electricity discharge circuit ESD.

The second auxiliary discharge line ADL2 may be the same material layer as the inner discharge line IDL.

The second auxiliary discharge line ADL2 may be the same material layer as the outer discharge line ODL.

The discharge link DCL may include a transparent conductive material.

The first auxiliary discharge line ADL1, the second auxiliary discharge line ADL2, and the discharge link DCL may be positioned to overlap with in the dam DAM.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure.

The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device, comprising:

a substrate;

a dam positioned on a marginal portion of the substrate;

an outer discharge line positioned further toward an outer edge of the substate than the dam;

an inner discharge line positioned further away from the outer edge of the substrate than the dam;

a discharge link contacting the outer discharge line and the inner discharge line, and extending as a single continuous layer from the outer discharge line to the inner discharge line to cover all of a top surface of the dam; and a static electricity discharge circuit electrically connected with the inner discharge line.

2. The display device of claim 1, further comprising:

a first auxiliary discharge line overlapping with the dam; and a second auxiliary discharge line overlapping with the dam.

3. The display device of claim 2, wherein the first auxiliary discharge line is positioned on the substrate, wherein the second auxiliary discharge line is positioned on the first auxiliary discharge line and contacts the first auxiliary discharge line, and wherein the discharge link is positioned on the second auxiliary discharge line and contacts the second auxiliary discharge line.

4. The display device of claim 2, wherein the first auxiliary discharge line has a same material layer as the static electricity discharge circuit.

5. The display device of claim 2, wherein the second auxiliary discharge line has a same material layer as the inner discharge line.

6. The display device of claim 2, wherein the second auxiliary discharge line has a same material layer as the outer discharge line.

7. The display device of claim 2, wherein the first auxiliary discharge line, the second auxiliary discharge line, and the discharge link are positioned to overlap with each other in the dam.

8. The display device of claim 1, wherein the outer discharge line has a dashed line shape.

9. The display device of claim 1, further comprising:

a driving circuit positioned on a first side surface of the substrate;

a data line area extending in a first direction; and a data line link area positioned between the driving circuit and the data line area, wherein the static electricity discharge circuit is positioned between the data line link area and the data line area.

10. The display device of claim 1, wherein the outer discharge line has a same material layer as the inner discharge line.

11. The display device of claim 1, wherein the discharge link includes a transparent conductive material.

12. The display device of claim 1, wherein the discharge link contacts a portion of a top surface of the substrate.

13. The display device of claim 1, further comprising an insulating layer that is disposed between the inner discharge line and the discharge link in a cross-sectional view and includes a contact hole, wherein the discharge link extends along a side of the contact hole and contacts the inner discharge line at a bottom of the contact hole.

14. The display device of claim 1, wherein the discharge link contacts both side surfaces and a top surface of the outer discharge line.

15. The display device of claim 1, wherein the discharge link extends along at least a partial side surface and at least a partial top surface of the dam, and a partial top surface of the substrate, and contacts at least a partial side surface and a top surface of the outer discharge line.

16. A display device, comprising:

a substrate including an active area where a plurality of subpixels are disposed, and a non-active area positioned outside the active area and surrounding the active area;

an outer discharge line positioned in the non-active area of the substrate;

an inner discharge line positioned in the non-active area of the substrate and further away from an outer edge of the substrate than the outer discharge line;

a discharge link positioned adjacent to the outer discharge line and extending perpendicular to the outer discharge line, and contacting the inner discharge line; and a static electricity discharge circuit electrically connected with the inner discharge line, wherein the discharge link contacts both side surfaces and a top surface of the outer discharge line, and contacts respective portions of a top surface of the substrate that are adjacent to the side surfaces of the outer discharge line in a cross-sectional view of the display device, to cover the outer discharge line.

17. The display device of claim 16, further comprising:

a dam positioned in the non-active area of the substrate and between the outer discharge line and the inner discharge line.

18. The display device of claim 16, wherein:

the static electricity discharge circuit is positioned on a first side surface of the substrate;

the outer discharge line is three lines respectively positioned adjacent to second, third and fourth side surfaces of the substrate; and the inner discharge line is one continuous line positioned on the second, third and fourth side surfaces of the substrate.

19. The display device of claim 16, wherein the outer discharge line contacts the discharge link.

20. The display device of claim 16, wherein the outer discharge line has a dashed line shape.

* * * * *